United States Patent [19]

Bedney

[11] Patent Number: 4,504,076
[45] Date of Patent: Mar. 12, 1985

[54] FORWARD-FOLDING AGRICULTURAL IMPLEMENT FEATURING NARROW ROW SPACING

[75] Inventor: Harris I. Bedney, Rock Island, Ill.

[73] Assignee: Deere & Company, Moline, Ill.

[21] Appl. No.: 532,866

[22] Filed: Sep. 16, 1983

[51] Int. Cl.$^3$ .............................................. B62D 21/14
[52] U.S. Cl. ................................ 280/411 A; 172/311; 280/43.23; 280/412; 280/656
[58] Field of Search ................... 280/656, 43.16, 43.23, 280/43.24, 80 B, 411 R, 412, 413, 411 A, 411 C, 411 B; 172/311, 446, 456, 776; 56/228, 385

[56] References Cited

U.S. PATENT DOCUMENTS

| | | | |
|---|---|---|---|
| 2,973,818 | 3/1961 | Marvin | 280/43.24 |
| 3,521,905 | 7/1970 | Tasset et al. | 172/456 |
| 3,791,673 | 2/1974 | Hornung | 280/411 A |
| 3,982,773 | 9/1976 | Stufflebeam et al. | 280/656 |
| 4,137,852 | 2/1979 | Pratt | 280/411 A X |
| 4,319,643 | 3/1982 | Carter et al. | 280/411 A |
| 4,364,581 | 12/1982 | Shoup | 280/656 X |

Primary Examiner—David M. Mitchell
Assistant Examiner—Mark C. Dukes
Attorney, Agent, or Firm—Henderson & Sturm

[57] ABSTRACT

An agricultural implement of the type capable of folding from a wide operating mode to a narrow transport mode. The folding involves forward folding of the right and left wing sections alongside the central, fore-and-aft hitch. Featured are support wheels respectively for the wing sections which are selectively movable from the extended, forward positions in the operating mode to retracted or rearward positions in the transport mode to enable the wing sections to be more closely folded relative to the hitch and thus to achieve a narrower transport width. The closely spaced end-to-end relationship of the wing sections in operating mode provide for relatively narrow row spacing because only the hitch intervenes between the proximate ends of the sections.

10 Claims, 6 Drawing Figures

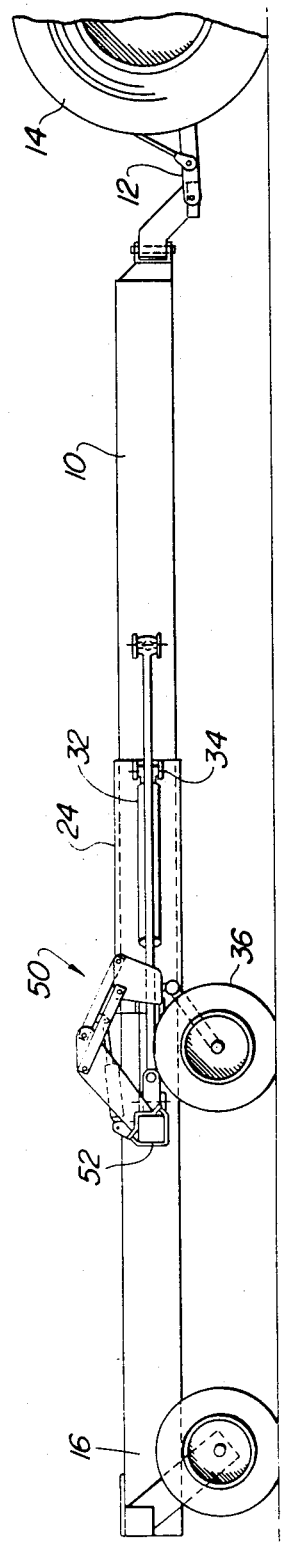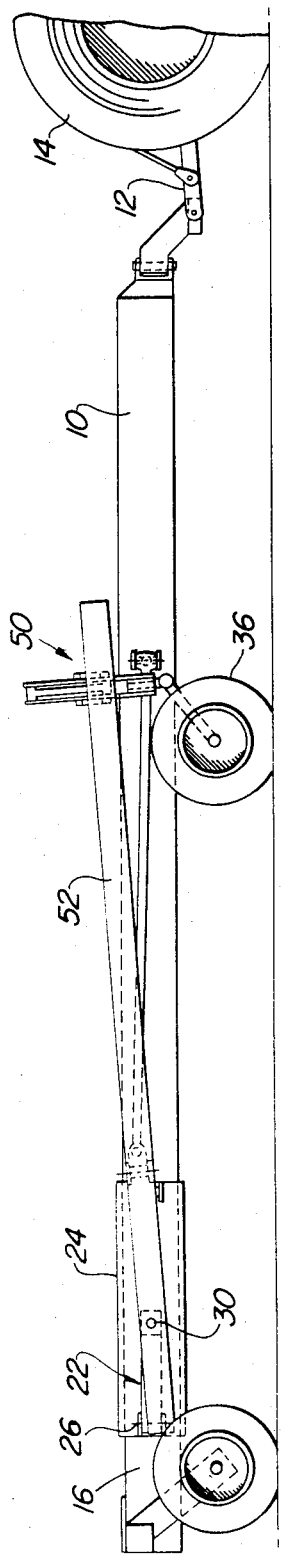

FORWARD-FOLDING AGRICULTURAL IMPLEMENT FEATURING NARROW ROW SPACING

BACKGROUND AND SUMMARY

Agricultural machines of the general character referred to in the "Abstract" hereof are well known, there being three basic types as to foldability of the wing sections; namely rear fold, vertical fold and forward fold. The forward fold appears to be the most widely favored and a good example of that type forms the subject matter of the Pratt U.S. Pat. No. 4,137,852. The machine there disclosed features three sections, each including row-crop tools (e.g. planting units), these sections being a central rear section and right and left wing sections. In operating mode, the three sections are disposed in alignement transversely to the line of draft. In folded or transport mode, the wing sections fold forwardly respectively along opposite sides of a telescopic hitch or tongue. Each section in the patent has one or more ground wheels interspaced among the planting units, which militates against extra-narrow row spacing. There are other versions of forward-fold machines which to some extent solve the narrow row problem but are fraught with other problems, especially lack of stability in transport mode and lack of convenience in converting from one mode to the other, in at least one known case requiring that the wing sections can be raised above the rear central section and thus projecting rearwardly thereof and further raising the center of gravity of the machine in transport.

According to the present invention, these problems are overcome by simple design and construction. The machine can be converted from one mode to the other and vice versa without the use of a telescopic hitch. The wheels on the wing sections are placed outwardly or forwardly so as not to intervene between row units, but are retractible rearwardly when the wings are folded so as to achieve a narrow transport width. Further, these wheels are caster wheels and can operate straight-ahead in either mode of operation and hence can serve as support wheels in either mode as well as between mode changes. The rear central section is without row units and the arrangement is such that this section is completely to the rear of the wing sections in either mode, thus more evenly distributing the weight of the machine as concerns the tractor drawbar (on which the machine tongue is supported) and also increasing the stability of the machine.

Features and advantages in addition to those set forth above will become apparent to those versed in the art as a preferred embodiment of the invention is disclosed in detail in the ensuing description and accompanying drawings.

DESCRIPTION OF THE DRAWINGS

FIG. 3 is a side view of the machine as shown in FIG. 1.

FIG. 4 is a side view of the machine as shown in FIG. 2.

DESCRIPTION OF A PREFERRED EMBODIMENT

Figure 1:
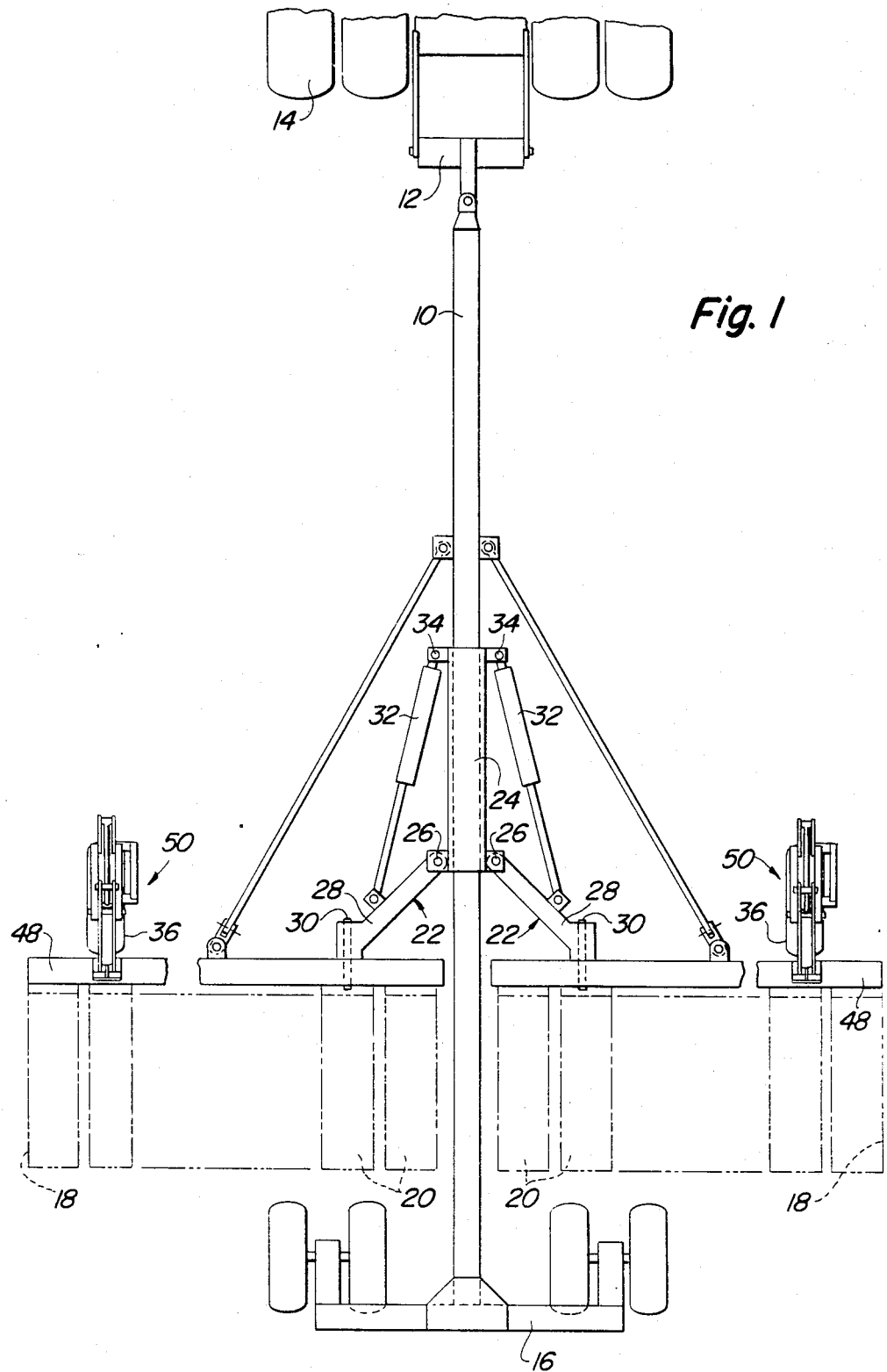
FIG. 1 is a plan view, with portions omitted to conserve space, of a preferred embodiment of the invention shown in operating mode.
Figure 2:
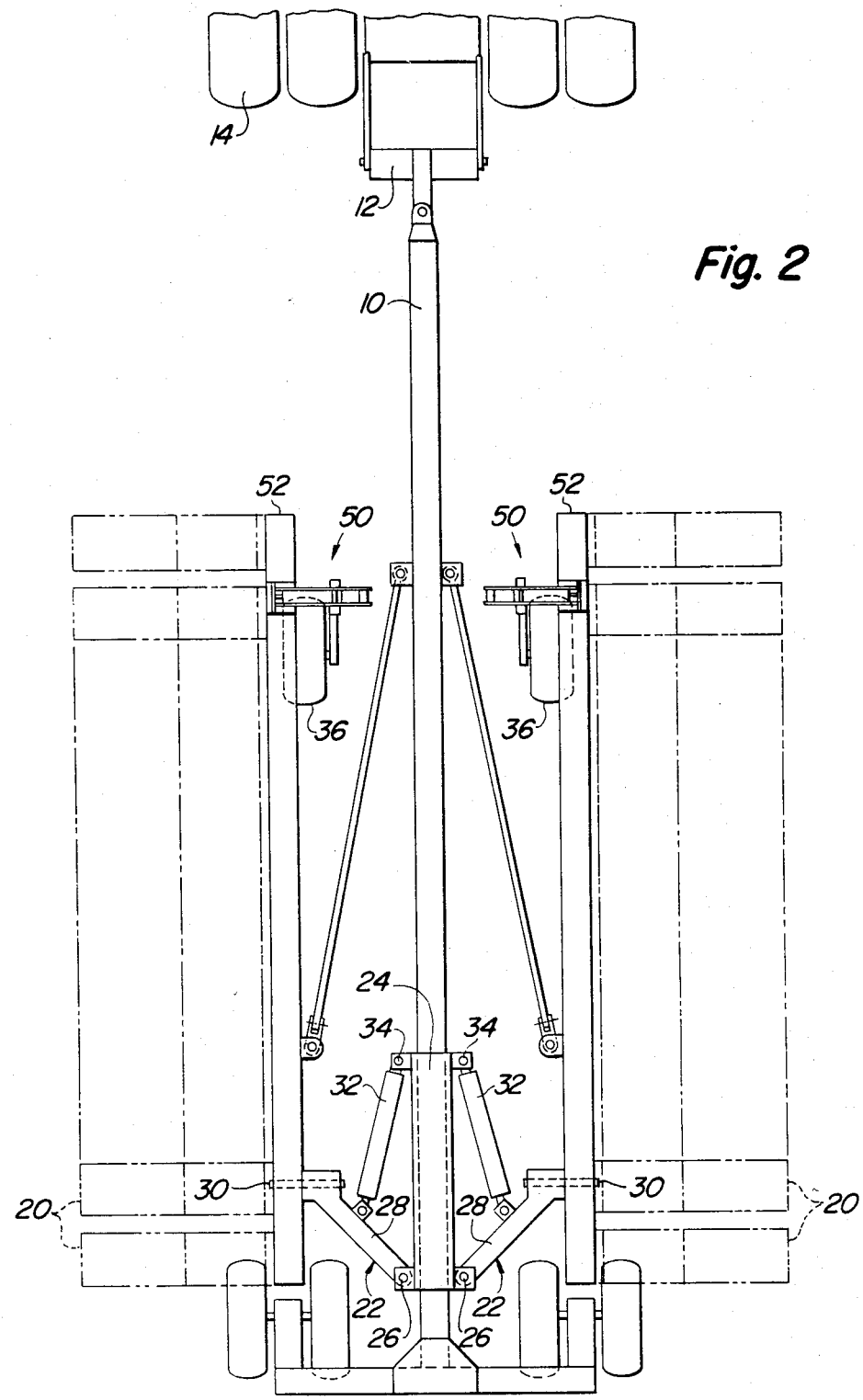
FIG. 2 is a plan view of the same, shown in transport mode.

By way of illustration, the machine shown here has a central, fore-and-aft hitch 10 having a front end connected to and supported on a drawbar 12 of a typical farm tractor 14 and further having its rear end carried by a wheeled carriage or truck 16. The hitch is flanked by right and left wing sections 18 which are conventionally mirror images of each other. As is known to those versed in the art, each wing section is of substantial length measured transversely to the fore-and-aft centerline of the machine and thus the machine in operating mode (FIGS. 1 and 3) is quite wide. Also, as is typical, each wing section may carry any form of agricultural tool, here indicated in broken lines as planting units 20. Because of the extreme width of the machine in operating mode, it is virtually impossible to transport the machine along roads, through gates, etc., and, hence, as is already known, means must be provided to enable folding (here forwardly) of the wing sections respectively along opposite sides of the hitch, as seen in FIG. 2 especially.

For the purpose of accomplishing the requisite folding, the machine includes right and left pivotal connections 22 for connecting the wing sections respectively to the hitch. The pivotal connections cooperate with a fore-and-aft slide 24 mounted on the hitch, and each connection includes a vertical pivot 26 between the slide and an arm 28 which in turn includes a horizontal pivot 30 to the associated wing section. Each vertical pivot enables forward and rearward swinging of the associated wing section between operating and transport modes and each horizontal pivot enables vertical flexing of the wing section, as in following ground contour.

Power-operated means is provided for moving the wing sections between their two modes, in this case comprising right and left hydraulic cylinders 32 connected respectively between the arms 28 and forward ears 34 on the slide 24. As seen in FIG. 1, the cylinders are extended when the wing sections are in operating mode. FIG. 2 shows that the cylinders when retracted, achieve the transport or folded mode of the sections. During changes from one mode to another, the length of the hitch does not change and in both modes the distance between the drawbar of the tractor and the rear truck 16 remains the same.

Because each section has a substantial overhang relative to its pivotal connection 22, it is clear that additional support is required, preferably from the ground. In this case, the machine has right and left ground-engaging wheels 36 respectively for the right and left wing sections. Each wheel is associated with a carrier 38 by means of an axle 40, an arm 42 rigid with the axle and a vertical spindle 44 rigid with the arm and journaled in the carrier at 46, the whole making the wheel a caster wheel. Each carrier is mounted on or connected to the associated wing section by means of a wing section frame portion or beam 48. When the wing section occupies its operating mode the beam is transverse to the hitch and forwardly or ahead of the planting units, etc., 20. When the wing section is in transport, the beam lies fore and aft and closely alongside the hitch. Compare FIGS. 1 and 2.

Figure 5:
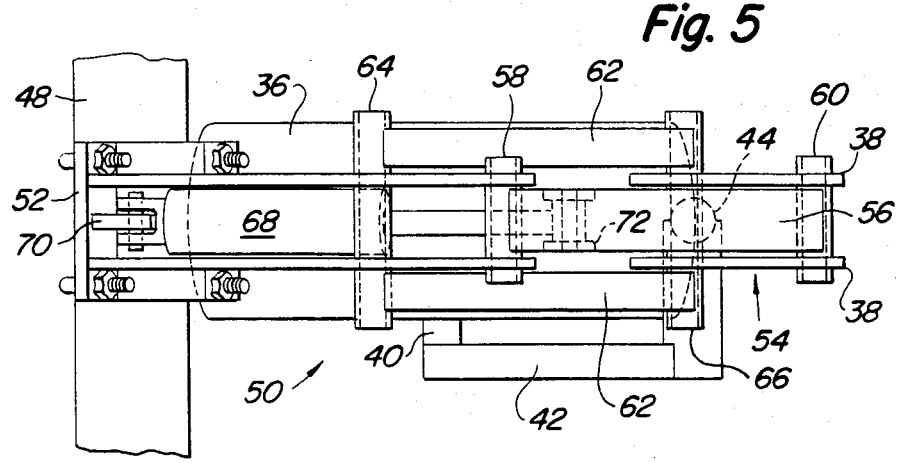
FIG. 5 is a fragmentary, enlarged plan of a wing-supporting wheel and its mounting on a wing section.
Figure 6:
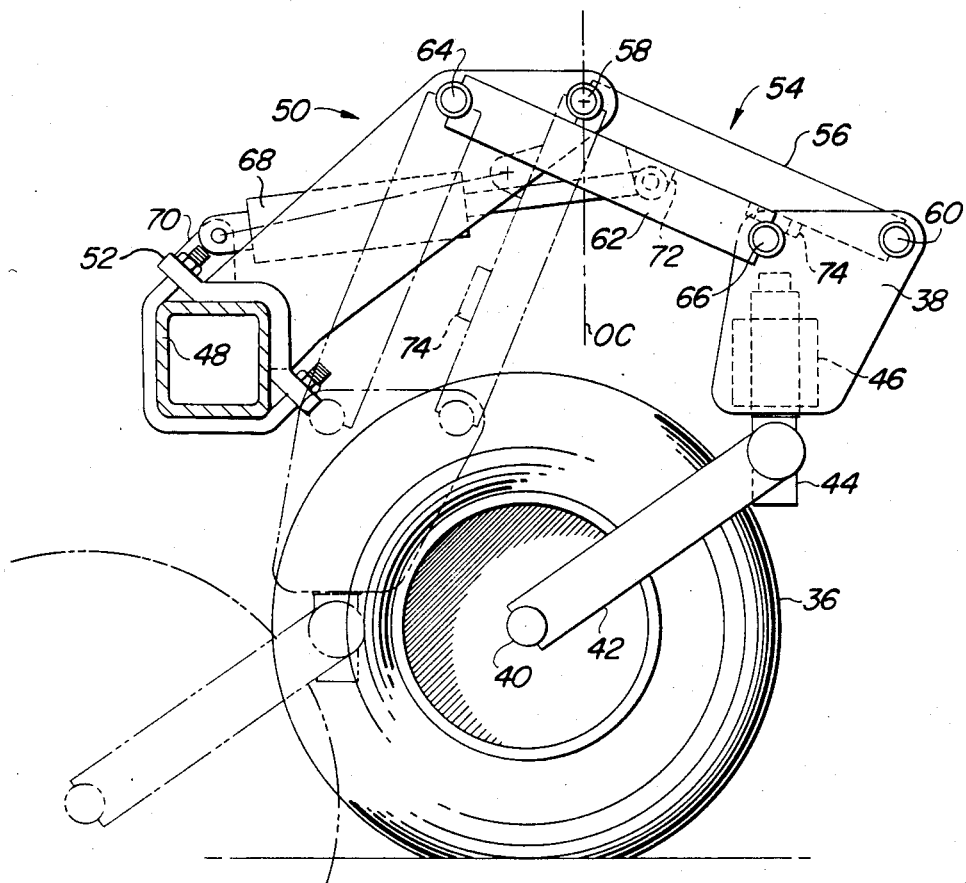
FIG. 6 is a side view of the same, full lines indicating the position of the wheel in the operating mode and broken lines designating the wheel in its transport mode.

Each means for mounting the carrier to the wing section beam is designated generally at 50 (FIGS. 5 and 6) and includes a bracket 52 rigidly attached to the beam and linkage means 54 extending between the bracket and the carrier 38. Each linkage means includes parallel links in the form of an upper link 56 pivoted on a horizontal axis to the beam bracket at 58 and likewise to the carrier at 60, and lower links 62 pivoted to the beam bracket at 64 and to the carrier at 66 respectively. This linkage enables selective movement of the wheel and its carrier between an extended or forward position (full lines in FIG. 6) and a rear or retracted position (dotted lines FIG. 6). The extended position is used in the operating mode to place the wheel forwardly for increased stability and also to prevent the wheel from interfering with the adjacent planting units. When the wing section and its beam 48 are moved to the transport mode, the beam of course lies alongside the hitch and the wheel and its carrier are retracted beneath the beam (dotted lines in FIG. 6) so that actually the wheel and carrier are retracted away from the hitch, thus enabling the wing section to move ever more closely to the hitch to further narrow the machine for transport. In this position, the wheel, being a caster wheel, swings so that its axle is transverse and, even though the wheel is beneath the wing section beam, it still lies clear of the planting units (FIG. 2).

The means for selectively moving the wheel and carrier unit between its positions may take the form of a hydraulic cylinder 68 connected between an ear 70 on the beam bracket 52 and an ear 72 on the upper link 56 of the parallel linkage. When the cylinder is retracted, the links 56 and 62 swing to the dotted-line position of FIG. 6 and, in doing so, an over-center status (line OC) is passed, the links passing to the rear of this line and thus locking in the dotted-line position. Conversely, when swinging back to the full-line position, the lower link encounters a stop 74 rigid on the upper link and locking the linkage in a position forwardly of the over-center status. As best seen in FIG. 4, an incident to the retracting of the caster wheel is the raising of the wing section and its beam, which occurs about the horizontal pivot 30 of the associated pivotal connection 22 to the hitch 10.

As will have been seen, each caster wheel supports its wing section in both modes and during mode changes. In operating mode, desirable weight distribution is accomplished among the tractor, caster wheels and rear wheeled truck. It is especially in transport, when the wing sections remain supported by their caster wheels, that increased stability is obtained. Also, in both positions, the hitch is relieved of the total weight of the wing sections. Various other features and advantages will occur to those versed in the art, as will many changes and modifications in the preferred embodiment disclosed, all of which may be achieved without departure from the spirit and scope of the invention.

I claim:

1. In an agricultural machine having a central fore-and-aft hitch supported at its rear end portion on a wheeled carriage and at its forward end portion on a tractor, right and left wing sections respectively at right and left sides of the hitch and ahead of the carriage, right and left pivotal connections respectively connecting the sections to the hitch for selective disposition of the wing sections in an operating mode in substantially end-to-end alignement transverse to the hitch and a transport mode folded forwardly alongside opposite sides of the hitch, each pivotal connection including a horizontal pivot for vertical flexing of its section and a vertical pivot for folding of its section, each section including a frame portion which is disposed forwardly in the operating mode of the section and which lies closely adjacent to the hitch in the transport mode of the hitch, and right and left wing-supporting wheels respectively for the sections, the improvement comprising a pair of wheel carriers, one for and journaling each wheel for rolling on the ground, and a pair of mounting means, one for each carrier, each means connecting its carrier to the respective wing frame portion for selective movement between an extended position in which the associated wheel and carrier are ahead of the frame portion in the operating mode of the section and a retracted position rearwardly of the extended position and closely adjacent to the associated frame portion in the transport mode of the section.

2. In an agricultural machine according to claim 1, the further improvement in which each wing-supporting wheel is a caster wheel.

3. In an agricultural machine according to claim 2, the further improvement in which each carrier mounting means is so constructed and arranged that its wheel engages the ground and supports its wing in both modes as well as in movement of its section between modes.

4. In an agricultural machine according to claim 1, the further improvement in which each mounting means is so constructed and arranged that in its retracted position its wheel is disposed at least partly beneath its section.

5. In an agricultural machine according to claim 1, the further improvement in which each mounting means includes parallel linkage.

6. In an agricultural machine according to claim 5, the further improvement in which the linkage operates about horizontal axes.

7. In an agricultural machine according to claim 6, in which each linkage is so constructed and arranged as to pass through an over-center status during movement of its wheel and carrier between retracted and extended positions.

8. In an agricultural machine according to claim 7, the further improvement in which the linkage locks past the over-center status in the retracted position of the associated carrier and wheel.

9. In an agricultural machine according to claim 7, the further improvement in which the linkage locks past the over-center status in the extended position of the wheel and carrier.

10. In an agricultural machine according to claim 7, the further improvement in which the linkage locks to one side of the over-center status in the extended position of the wheel and carrier and locks to the other side of the over-center status in the retracted position of the wheel and carrier.

* * * * *